(12) United States Patent
Naddeo (10) Patent No.: US 8,903,960 B2
(45) Date of Patent: Dec. 2, 2014

(54) ACTIVATE ATTRIBUTE FOR SERVICE PROFILES IN UNIFIED COMPUTING SYSTEM

(75) Inventor: Christopher Naddeo, Doylestown, PA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 12/973,971

(22) Filed: Dec. 21, 2010

(65) Prior Publication Data

US 2012/0158928 A1 Jun. 21, 2012

(51) Int. Cl.
G06F 15/16 (2006.01)
G06F 11/20 (2006.01)
H04W 8/20 (2009.01)
G06F 9/445 (2006.01)
H04L 29/08 (2006.01)

(52) U.S. Cl.
CPC ............. G06F 11/2028 (2013.01); H04W 8/20 (2013.01); H04L 29/08072 (2013.01); G06F 8/61 (2013.01)
USPC ........... 709/220; 709/224; 709/226; 709/227; 455/433; 370/338

(58) Field of Classification Search
USPC ........................................ 709/220, 224, 229
See application file for complete search history.

(56) References Cited

U.S. PATENT DOCUMENTS

| | | | |
|---|---|---|---|
| 6,058,289 A * | 5/2000 | Gardner et al. .............. 340/7.32 |
| 6,058,490 A | 5/2000 | Allen et al. |
| 6,480,476 B1 * | 11/2002 | Willars ......................... 370/311 |
| 6,785,256 B2 * | 8/2004 | O'Neill ......................... 370/338 |
| 7,061,923 B2 * | 6/2006 | Dugan et al. .................. 370/396 |
| 7,209,964 B2 * | 4/2007 | Dugan et al. .................. 709/223 |
| 7,275,098 B1 * | 9/2007 | Becher et al. ................. 709/223 |
| 8,179,840 B2 * | 5/2012 | O'Neill ......................... 370/328 |
| 8,683,354 B2 * | 3/2014 | Khandelwal et al. ......... 715/757 |
| 2002/0083166 A1 * | 6/2002 | Dugan et al. .................. 709/223 |
| 2003/0074463 A1 * | 4/2003 | Swartz et al. ................. 709/230 |
| 2003/0176188 A1 * | 9/2003 | O'Neill ......................... 455/433 |
| 2004/0139205 A1 | 7/2004 | Ichikawa et al. |
| 2007/0143374 A1 | 6/2007 | D'Souza et al. |
| 2008/0016389 A1 | 1/2008 | Talaugon et al. |
| 2009/0077370 A1 | 3/2009 | Barabash et al. |

OTHER PUBLICATIONS

Cisco USC Manager, "Understanding Cisco Unified Computing System Service Profiles," http://www.cisco.com/en/US/prod/collateral/ps10265/ps10281/white_paper_c11-590518.html; pp. 1-9., Copyright 1992-2010.
International Search Report and Written Opinion dated Aug. 19, 2011 in corresponding PCT/US2011/031915.

* cited by examiner

*Primary Examiner* — Khanh Dinh
(74) *Attorney, Agent, or Firm* — Edell, Shapiro & Finnan, LLC (57) ABSTRACT

An enterprise computing system is provided comprising a plurality of server computers and a management server configured to communicate with the plurality of server computers. The management server stores data indicating the service profiles installed on respective server computers and an activation status of the service profiles on the respective server computers. Each service profile comprises data defining attributes for the server computer and includes an activation attribute for the service profile indicating whether the service profile is active on the corresponding server computer. The management server sends the service profiles to the together with an activation attribute for each service profile to server computers such that any service profile that is installed on multiple server computers is active on one server computer at any given time.

21 Claims, 6 Drawing Sheets

- Store data indicating the service profiles installed on respective server computers and activation status of the service profiles on the respective server computers — 110

- Send data for the service profiles to the respective server computers with an Activation Attribute for each service profile such that any service profile that is installed on multiple server computers is activated on only one server computer at any given time — 120

- Determine need to change the status of a service profile on a server computer or receive command from network administrator to make a change — 130

- Send de-activate command to a first server computer on which a particular service profile is activated, the de-activate command configured to de-activate the particular service profile on the first server computer — 140

- Send activate command to a second server computer on which the particular service profile is installed but not activated, the activate command configured to activate the particular service profile on the second server computer — 150

- Send advertisement messages to notify other equipment that utilize the server computers as to the service profiles and their activation attributes — 160

ACTIVATE ATTRIBUTE FOR SERVICE PROFILES IN UNIFIED COMPUTING SYSTEM

TECHNICAL FIELD

The present disclosure relates to activation of servers in a unified computing system.

BACKGROUND

In an enterprise computing system, there are multiple server computers, called server blades, which provide computing resources for any of a variety of functions in the computing system. A server blade is configured with a service profile that defines the computing functions and related attributes for the functions the server blade is to perform.

Once a server blade is configured with a service profile, the service profile is fixed on that server blade and can moved to another server blade only after a somewhat timely procedure. This can degrade availability in the computing system, particularly when a server blade fails and it is necessary to have another server blade perform those functions.

DESCRIPTION OF EXAMPLE EMBODIMENTS

Overview

At a management server in an enterprise computing system comprising a plurality of server computers that communicate with the management server, data is stored indicating the service profiles installed on respective server computers and an activation status of the service profiles on the respective server computers. Each service profile comprises data defining hardware, connectivity and operational attributes for the server computer and including an Activation Attribute for the service profile indicating whether the service profile is active on the corresponding server computer. The management server sends to the respective server computers data for the service profiles with an Activation Attribute for each service profile such that any service profile that is installed on multiple server computers is active on one server computer at any given time.

Example Embodiments

Figure 1:
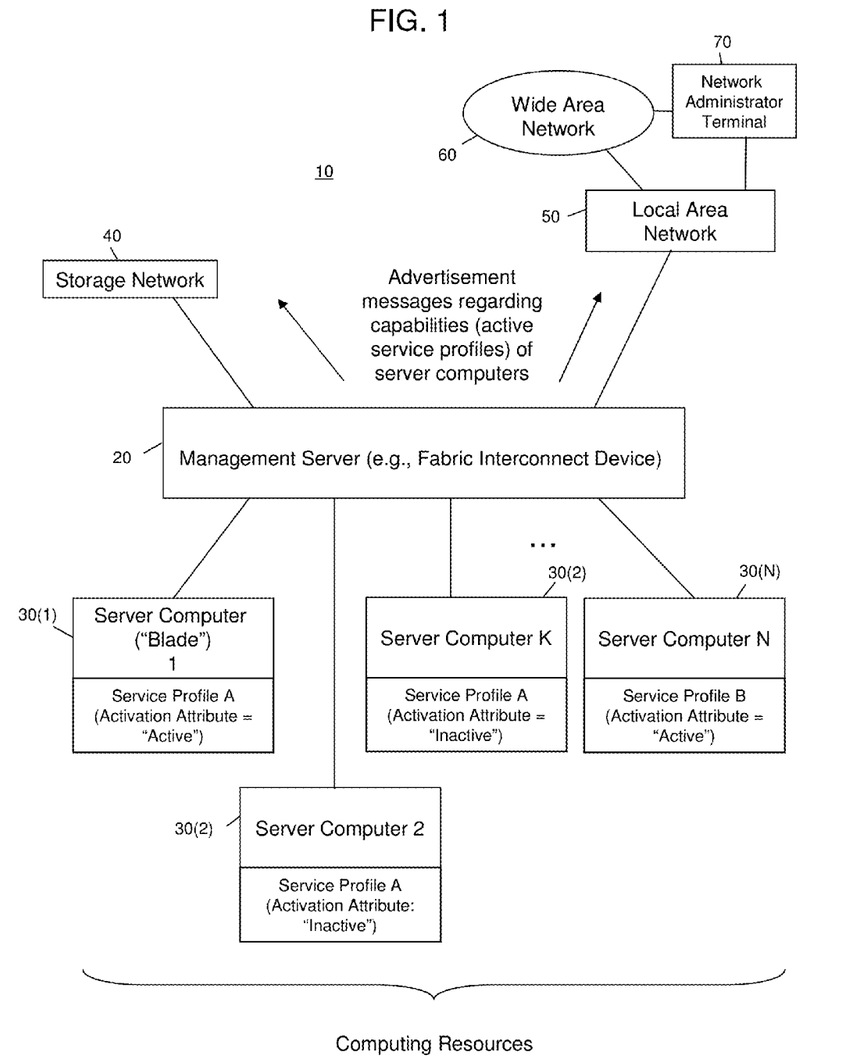
FIG. 1 is a diagram depicting an example of a computing system in which a service profile may be installed on multiple server computers but active on one server computer at any given time.

Referring first to FIG. 1, a block diagram is shown for an example enterprise computing system. The enterprise computing system, shown at reference numeral 10, comprises a management server 20 and a plurality of server computers 30(1)-30(N). The plurality of server computers 30(1)-30(N) serve as a pool of computing resources. There are also storage devices in a storage network 40 that are used to store data. Requests to use the computing resources of the server computers 30(1)-30(N) are received via a local area network 50 or via a wide area network 60, e.g., the Internet. In one example, the management server 20 is a fabric interconnect device, e.g., a data center switch that has multilayer and multiprotocol capabilities, and can transport data over Ethernet, including Layer 2 and Layer 3 traffic, and storage traffic, all on one common data center-class platform. The server computers 30(1)-30(N) are also known as server blades in that they are embodied in a "blade" configuration to mount within a chassis unit that has slots for multiple blades.

Each server computer is provisioned and configured with a service profile. A service profile comprises of data that defines hardware, connectivity and operational attributes for the server computer. The service profile is a self-contained definition of server and connectivity configuration and identity for the server computer on which it is installed.

According to the techniques described herein, a given service profile is installed and thus pre-associated on multiple server computers, but that service profile is activated on one server computer and remains inactive on the other server computers on which it is installed. As shown in the example of FIG. 1, Service Profile A is installed on server computers 30(1), 30(2), . . . , 30(K) but is activated on server computer 30(1), whereas it is in a dormant or inactive state on server computers 30(2)-30(K). A different service profile, Service Profile B, is installed and active on server computer 30(N). It should be understood that Service Profile B may also be installed on multiple other server computers but in a dormant or inactive state. Thus, in general, any given service profile may be installed on multiple server computers but is activated on one server computer at any given time. By pre-associating the same service profile concurrently to multiple server computers, the service profile can be effectively "moved" from one server computer to another server computer at any time, and in a much more expedited manner, than heretofore possible. For example, if the management server 20 determines for some reason that the operations of Service Profile A would be better served on a different server computer, then the management server 20 can de-activate Service Profile A on server computer 30(1) and activate Service Profile A on any one of the server computers 30(2)-30(K) on which Service Profile A was previously installed and in an inactive state. Consequently, server hardware replacement is essentially instantaneous, allowing for rapid recovery or redeployment of the application consuming the blade hardware. The server computer on which a service profile is installed but not active is kept in a low power state until such time as the management server 20 determines to activate the service profile on that server computer.

The management server 20 controls which service profiles are installed and activated (and de-activated) on which of the plurality of server computers 30(1)-30(N). In one example, the management server 20 serves as a portal for all control/command and data traffic to and from the server computers 30(1)-30(N), as in a Cisco Unified Computing System. However, this is only an example and in another form, the management server 20 may be the point of control for the server computers 30(1)-30(N) but all traffic to and from the server computers 30(1)-30(N) does not pass through it.

The management server 20 sends to the respective server computers data for the service profiles with an Activation Attribute for each service profile that indicates whether the service profile is active or inactive on the respective server computers. For example, the management server 20 sends a data file for Service Profile A to server computer 30(1) with an Activation Attribute indicating that Service Profile A is active on server computer 30(1), and to server computer 30(2) with an Activation Attribute indicating that Service Profile A is inactive on server computer 30(2), . . . , and to server computer 30(K) with an Activation Attribute indicating that Service Profile A is inactive on server computer 30(K). The management server 20 would configure other server computers with other service profiles in a similar manner.

A network administrator (person) may manually control the service profiles to be installed (pre-associated) on specified ones of the plurality of server computers 30(1)-30(N) via a network administrator terminal 70, e.g., a desktop or laptop computer or other computer with a suitable user interface, that communicates with the management server 20 via the local area network 50 or wide area network 60. For example, activation of a service profile in a given server computer may be achieved by a network administrator/user action (e.g., selecting a button or command in a user interface screen). In another example, a command to activate a service profile in a particular server computer may be from an external External Markup Language (XML) or other protocol application programming interface (API) from a clustering framework.

In addition, the management server 20 may continuously monitor activity among the server computers 30(1)-30(N) and determine a need to de-activate a particular service profile on one server computer and activate it on another server computer. Moreover, the management server 20 generates and sends to the other entities in the system 10 advertisement messages regarding capabilities of the server computers, e.g., messages advertising the service profiles that are active on the various server computers 30(1)-30(N). When a service profile is "moved" from one server computer to another server computer, the management server 20 reflects that change in the advertisement messages it sends. For example, if Service Profile A is de-activated on server computer 30(1) and activated on server computer 30(2), then the management server 20 reflects this in the advertisement messages, e.g., "Service Profile A: Inactive on Server Computer 30(1), Service Profile A: Active on Server Computer 30(2)." The management server 20 will advertise that a service profile is available on a server computer when it is active on that server computer. In general, a server computer can execute one service profile at any time and a single service profile can be installed (pre-associated) on a server computer at any time. Moreover, a server computer with a dormant or inactive service profile is not advertised to the rest of the system.

Figure 2:
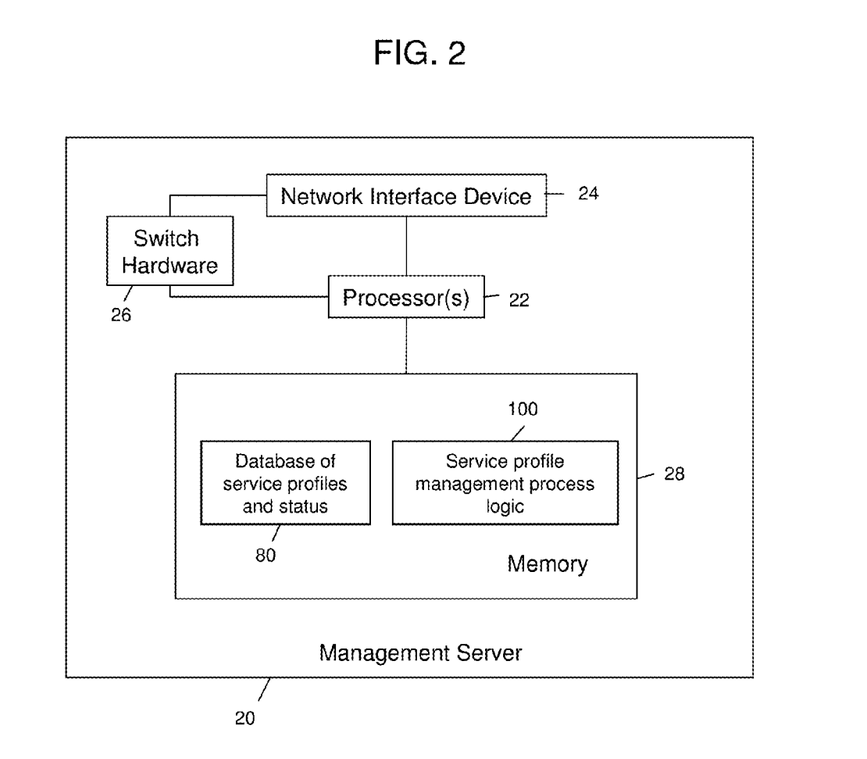
FIG. 2 is a block diagram for an example of a management server that is configured to manage the status of the same service profile installed on multiple server computers.

Reference is now made to FIG. 2, which is a block diagram for an example of the management server 20. The management server 20 comprises one or more computing processors 22, a network interface device 24, switch hardware 26 and a memory 28. The one or more processors 22 may be, for example, microprocessors, microcontrollers or digital signal processors. The network interface device 24 is a network interface card (NIC) that enables communication over a network. The switch hardware 26 is a block of digital logic gates, implemented in one or more application specific integrated circuits (ASICs), for example. The switch hardware 26 performs the various packet forwarding and switching operations associated with the management server 20, in one form.

The memory 28 may comprise read only memory (ROM), random access memory (RAM), magnetic disk storage media devices, optical storage media devices, flash memory devices, electrical, optical, or other physical/tangible memory storage devices. The memory 28 stores data to track the service profiles and their status (active or inactive) on the server computers 30(1)-30(N), for example, in a database 80. The memory 28 also stores executable software instructions for service profile management process logic 100. Thus, the memory 28 may comprise one or more computer readable storage media (e.g., a memory device) encoded with software comprising computer executable instructions and when the software is executed (by processor(s) 22) it is operable to perform the operations described herein in connection for the process logic 100.

In general, process logic 100 is operable to cause the processor(s) 22 to store in memory 28 data indicating the service profiles installed on respective ones of a plurality of the server computers in an enterprise computing system and an activation status of the service profiles on the respective server computers, wherein each service profile comprises data defining hardware, connectivity and operational attributes for the server computer and including an activation attribute for the service profile indicating whether the service profile is active on the corresponding server computer; and to send to the respective server computers data for the service profiles with an Activation Attribute for each service profile such that any service profile that is installed on multiple server computers is active on one server computer at any given time.

Figure 3:
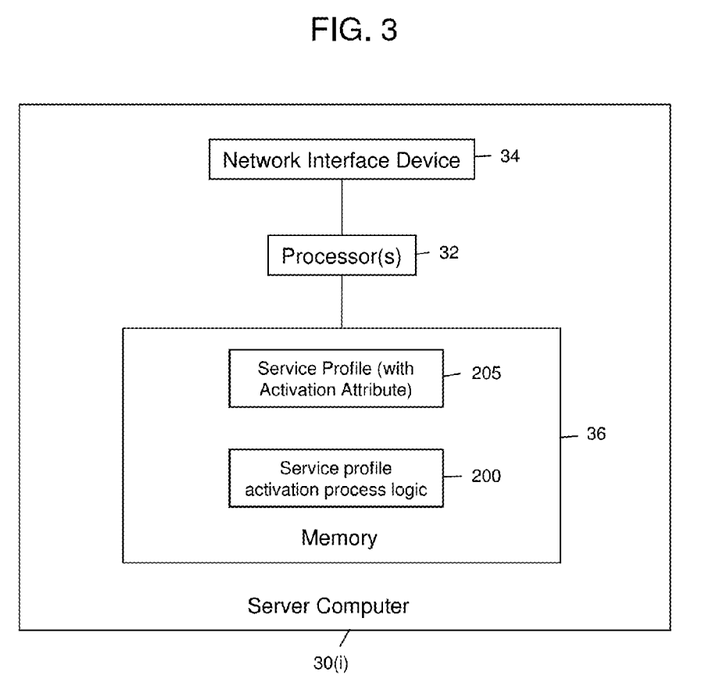
FIG. 3 is a block diagram for an example of a server computer that stores a service profile with an Activation Attribute that determines whether the service profile is to be active on the server computer.

Reference is now made to FIG. 3. FIG. 3 is a block diagram for an example of a server computer 30(i), e.g., any one of the server computers 30(1)-30(N). A server computer comprises, in general, one or more processors 32, a network interface device 34 and memory 36. The memory 36 stores executable software instructions for service profile activation process logic 200 and also stores data for a service profile shown at reference numeral 205 and including an Activation Attribute indicating whether the service profile is active or inactive on the server computer. Like memory 28 of management server 20, the memory 36 may comprise ROM, RAM, magnetic disk storage media devices, optical storage media devices, flash memory devices, electrical, optical, or other physical/tangible memory storage devices.

Figure 4:
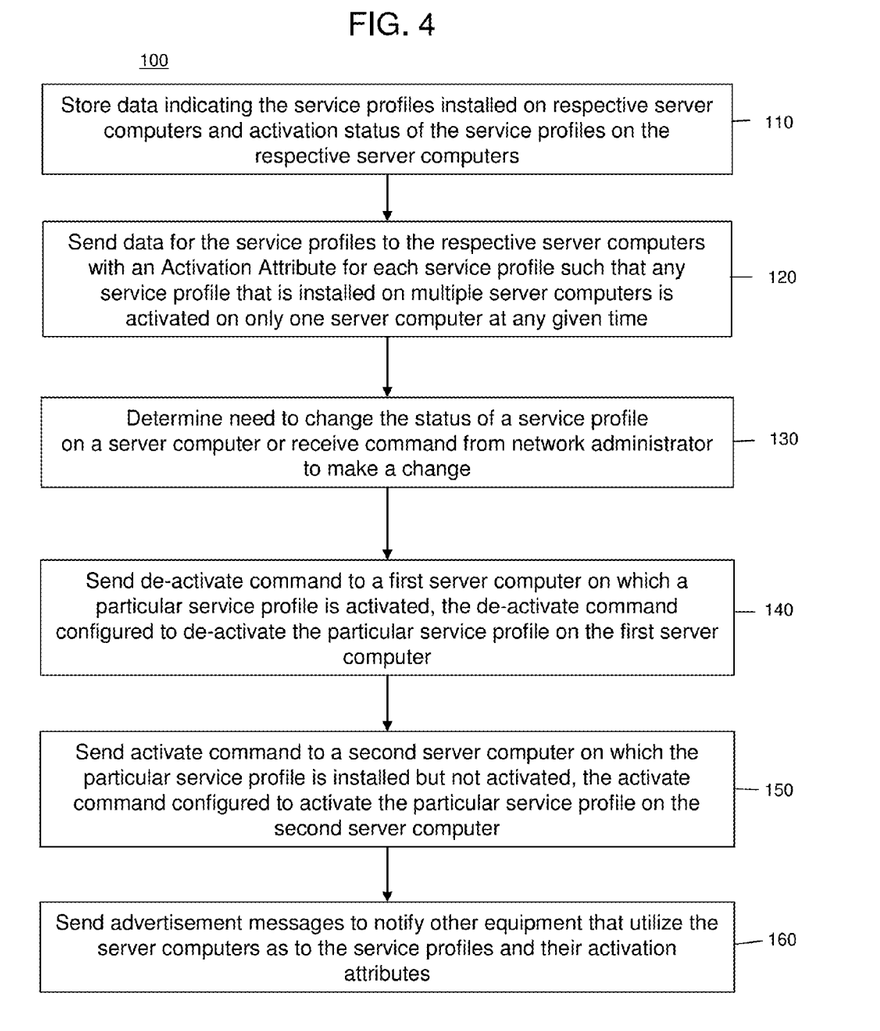
FIG. 4 is a flow chart that depicts examples of operations performed by the management server to manage the status of the same service profile installed on multiple server computers.

Reference is now made to FIG. 4 for a description of a flow chart for the service profile management process logic 100 running in the management server 20. At 110, the management server 20 stores data indicating the service profiles installed on respective server computers and the activation status of the service profiles on the respective server computers. The operation 110 thus involves storing data in the database 80 (FIG. 2) that tracks the service profiles pre-associated on the server computers and the service profile status as indicated by the Activation Attribute of each service profile installed on a server computer. As explained above, each service profile comprises data defining hardware, connectivity and operational attributes for the server computer and including an Activation Attribute for the service profile indicating whether the service profile is active on the corresponding server computer. At 120, upon initial setup of the computing system 10 and then any time thereafter as needed, the management server 20 sends to the respective server computers data for the service profiles with an Activation Attribute for each service profile such that any service profile that is concurrently installed on multiple server computers is active on one server computer at any given time.

At any point in time, a service profile that is active on one server computer can be de-activated on that server computer and activated on another server computer, thus effectively "moving" the service profile from one server computer to another server computer. Since the service profile is already installed on multiple server computers, it can be quickly activated by the management server 20 without the need to perform a more time-consuming installation of the service profile on the new server computer where it is to be activated. In some systems, it can take five to six minutes for the processor node utility operating system (PNUOS) in a server computer to install a new service profile. However, using the techniques described herein, this delay is avoided. Thus, the performance and availability of the system can be maintained since the amount of time that a given service profile is "out of service" is substantially reduced. Since a service profile is already installed on a server computer, it can be activated as fast as a server computer can be woken up from a low power state in response to an activate command from the management server.

At 130, a determination is made of a need to change the status of a service profile on a server computer. For example, the management server 20 may determine that a particular server computer is not operating at full speed due to a failure or other problem, and as such, the service profile would be better served on a different server computer (that has already been pre-installed with that service profile). In another example, a network administrator may determine that a service profile should be de-activated on a particular server computer and activated on a different server computer for any of a variety of reasons (load balancing, operational efficiencies, etc.), in which case a command, generated at a network administrator terminal, is received at the management server 20 to initiate the change.

When it is determined at 130 that a service profile change is needed, operations 140 and 150 are performed in response to that determination. For simplicity in this description, the server computer on which a particular service profile is active and is to be de-activated is referred to, arbitrarily, as a first server computer, and the server computer on which that particular service profile is inactive and is to be activated is referred to, arbitrarily, as a second server computer. At 140, the management server sends a de-activate command to a first server computer on which a particular service profile is activated, the de-activate command configured to de-activate the particular service profile on the first server computer. The de-activate command is a command configured to change the Activation Attribute for the particular service profile on the first server computer from "Active" to "Inactive."

At 150, the management server sends an activate command to the second server computer on which the particular service profile is installed but not activated, the activate command configured to activate the particular service profile on the second server computer. The activate command is a command that is configured to change the Activation Attribute for the particular service profile on the second server computer from "Inactive" to "Active."

At 160, the management server sends advertisement messages to notify other equipment in the computing system that utilize the server computers as to the service profiles and their activation attributes on the respective server computers, and in particular to indicate on which server computers the various service profiles are active. Operation 160 is performed upon initial setup of the computing system and thereafter to track updates/changes to the status of service profiles on the server computers.

To summarize and generalize, the process logic 100 involves, at a management server in an enterprise computing environment comprising a plurality of server computers that communicate with the management server, data is stored indicating the service profiles installed on respective server computers and an activation status of the service profiles on the respective server computers, wherein each service profile comprises data defining hardware, connectivity and operational attributes for the server computer and including an Activation Attribute for the service profile indicating whether the service profile is active on the corresponding server computer; and sending to the respective server computers data for the service profiles with an Activation Attribute for each service profile such that any service profile that is installed on multiple server computers is active on one server computer at any given time.

Figure 5:
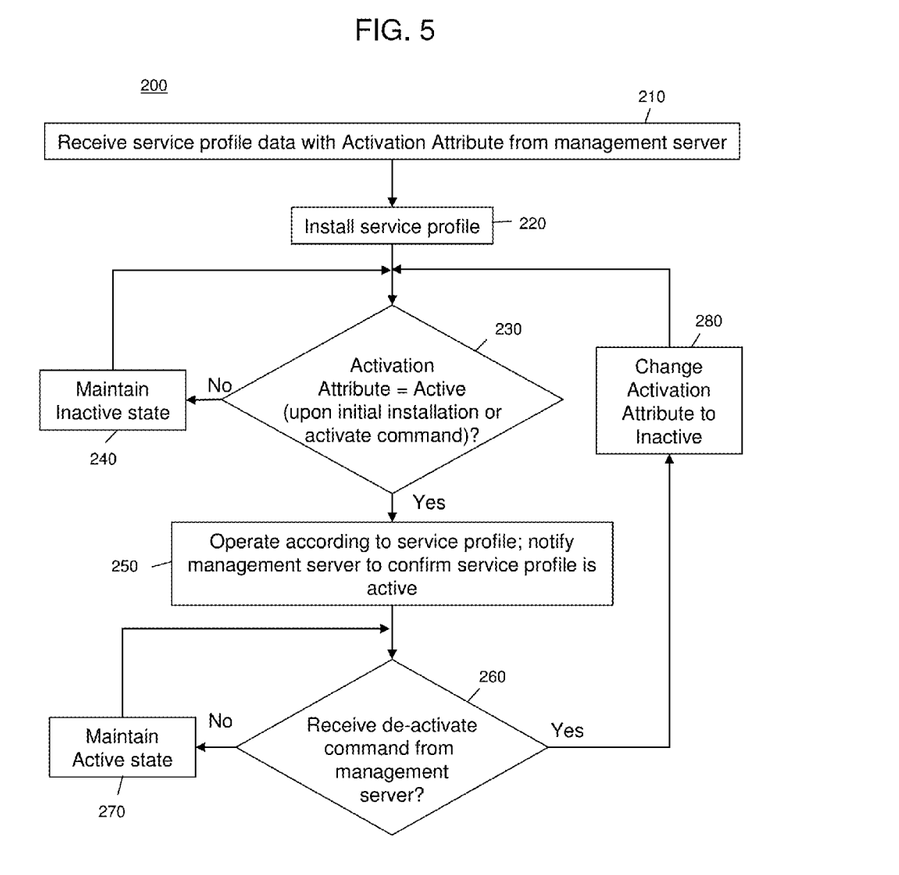
FIG. 5 is a flow chart that depicts examples of operations performed in a server computer that installs a service profile with the Activation Attribute.

Reference is now made to FIG. 5 for a description of a flow chart that depicts the operations of the service profile activation process logic 200 in a server computer. At 210, the server computer receives a service profile and an activation attribute for the service profile from the management server. At 220, the server computer installs the service profile and stores the Activation Attribute for the service profile. Installation of the service profile does not mean it is activated. The data for a service profile received from the management server may contain an Activation Attribute that is already set to Active upon initial installation, meaning that the server computer is to go active with the service profile immediately upon completing installation. On the other hand, the data for a service profile received from the management server may contain an Activation Attribute that is Inactive upon initial installation, meaning that the server computer is not to go active with the service profile until it receives an activate command from the management server. In the latter case, the server computer may go into a low power state, but otherwise capable of receiving and responding to an activate command from the management server.

Thus, at 230, the server computer evaluates the Activation Attribute for the service profile to determine whether it is active. When upon initial installation, the Activation Attribute for the service profile is determined to be Inactive at 230, then the process goes to state 240 in which the server computer remains dormant or inactive since its service profile is inactive. At 230, the server computer may determine to leave the dormant or inactive state in response to receiving an activate command, which causes the server computer to change the Activation Attribute for the service profile to Active, and to go to operation 250. Thus, operation 230 can result in activating a service profile that was inactive in response to receiving an activate command from the management server. When the activation command is received, the server computer activates the service profile and changes the Activation Attribute to Active in response to the activate command.

At 250, the server computer operates according to the parameters of the service profile. Also, the server computer notifies the management server to confirm that it is operating according to the service profile, i.e., that its service profile is active.

At any point in time when a server computer is operating with an active service profile, the server computer may receive a de-activate command from the management server. Thus, at 260, the server computer determines whether it has received a de-activate command from the management server. When a de-activate command has not been received, the server computer continues to maintain its active state and operate according to the service profile, as indicated at state 270. However, when service profile is active and the server computer determines at 260 that it has received a de-activate command, at 280, the server computer de-activates the service profile and changes the Activation Attribute to Inactive.

At 280, the server computer goes into a low power state and remains in this dormant or inactive state.

To summarize and generalize, the process logic 200 involves, at a server computer in an enterprise computing environment comprising a plurality of server computers that communicate with a management server, receiving from the management server data for a service profile that defines hardware, connectivity and operational attributes for the server computer and including an activation attribute for the service profile that indicates whether the service profile is active on the server computer; installing the service profile on the server computer with the activation attribute; and evaluating the activation attribute to determine whether to activate the service profile on the server computer.

The operations associated with the process logic 100 and 200 may also be embodied by one or more computer readable storage media encoded with software comprising computer executable instructions and when the software is executed, operable to perform the operations described herein. For example, the process logic 100 may be embodied by one or more computer readable storage media encoded with software comprising computer executable instructions and when the software is executed, operable to: at a management server in an enterprise computing system comprising a plurality of server computers that communicate with the management server, store data indicating the service profiles installed on respective server computers and an activation status of the service profiles on the respective server computers, wherein each service profile comprises data defining hardware, connectivity and operational attributes for the server computer and including an activation attribute for the service profile indicating whether the service profile is active on the corresponding server computer; and send to the respective server computers data for the service profiles with an activation attribute for each service profile such that any service profile that is installed on multiple server computers is active on one server computer at any given time.

Likewise, the process logic 200 may be embodied by one or more computer readable storage media encoded with software comprising computer executable instructions and when the software is executed, operable to: at a server computer in an enterprise computing system comprising a plurality of server computers that communicate with a management server, receive from the management server data for a service profile that defines hardware, connectivity and operational attributes for the server computer and including an activation attribute for the service profile that indicates whether the service profile is active on the server computer; install the service profile on the server computer with the activation attribute; and evaluate the activation attribute to determine whether to activate the service profile on the server computer.

Figure 6:
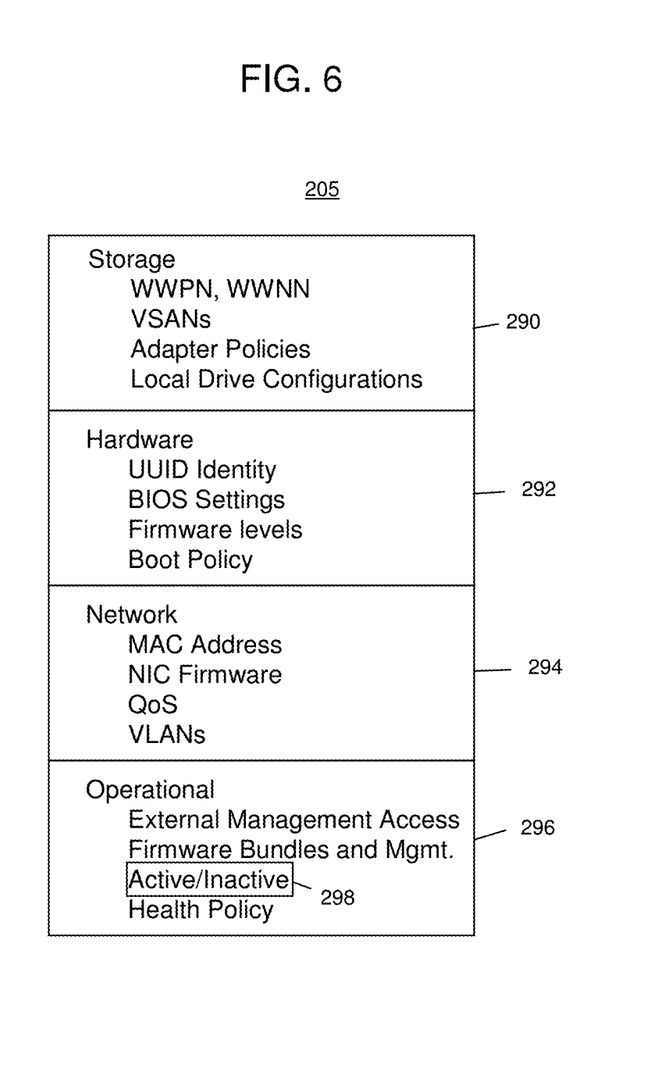
FIG. 6 is a diagram that illustrates examples of data for a service profile, including the Activation Attribute.

Reference is now made to FIG. 6 for a description of an example of data 205 for a service profile. There are several categories of attributes in a service profile, including storage attributes 290, hardware attributes 292, network attributes 294 and operational attributes 296. The storage attributes 290 include data indicating the World Wide Port Name (WWPN) or World Wide Node Name (WWNN) of the server computer, Virtual Storage Area Networks (VSANs) with which the server computer is associated, any adapter policies specifying error handling and timing settings, and configurations of the local storage drive of the server computer. The hardware attributes 292 include data indicating the Universally Unique Identifier (UUID) of the server computer, Basic Input/Output System (BIOS) settings, firmware levels/versions of the server computer, and boot policies. The network attributes 294 include data indicating the Media Access Control (MAC) address of the server computer, the network interface card (NIC) firmware (e.g., associated with the network interface device 34 (FIG. 3)) of the server computer, the Quality of Service (QoS) assigned to the server computer, and the virtual local area networks (VLANs) to which the server computer is assigned/associated. Finally, the operational attributes 296 include data indicating external management access, firmware bundles and management for the server computer, health policy of the server computer and importantly the Activation Attribute 298 that indicates whether the service profile is Active or Inactive.

The techniques described herein allow for fast failovers or re-associations of a service profile from one server computer to another server computer. These techniques are useful, in particular, for those servers which do not have clustering frameworks. A substantial amount of PNUOS processing time of the server computer is saved when a service profile is associated with multiple server computers and it becomes necessary to move a service profile from one server computer to another server computer.

The above description is intended by way of example only.

What is claimed is:

1. A method comprising:
    at a management server in an enterprise computing system comprising a plurality of server computers that communicate with the management server, storing data indicating the service profiles installed on respective server computers and an activation status of the service profiles on the respective server computers, wherein each service profile comprises data defining hardware, connectivity and operational attributes for the server computer and including an activation attribute for the service profile indicating whether the service profile is in an active state or in a dormant state on the corresponding server computer; and
    sending to the respective server computers data for the service profiles with an activation attribute for each service profile such that any service profile that is installed concurrently on multiple server computers is in the active state on only one server computer at any given time.

2. The method of claim 1, and further comprising sending a de-activate command from the management server to a first server computer on which a particular service profile is activated, the de-activate command configured to de-activate the particular service profile on the first server computer; and sending an activate command from the management server to a second server computer on which the particular service profile is installed but not active, the activate command configured to activate the particular service profile on the second server computer.

3. The method of claim 2, and further comprising at the management server, determining a need to de-activate the particular service profile at the first server computer and to activate the particular service profile at the second server computer, and wherein sending the de-activate command to the first server computer comprises sending the de-activate command to the second server computer is responsive to the determining.

4. The method of claim 1, and further comprising sending from the management server advertisement messages to notify other equipment in the computing system that utilize the plurality of server computers as to the service profiles and their activation attributes on the respective server computers.

5. The method of claim 1, and further comprising, at a server computer, receiving data for a service profile and an activation attribute for the service profile from the management server, and installing the service profile with the activation attribute at the server computer.

6. The method of claim 5, and further comprising receiving at the server computer from the management server an activate command configured to activate the service profile on the server computer when the service profile was inactive, activating the service profile and changing the activation attribute at the server computer to an active status in response to the activate command.

7. The method of claim 5, and further comprising receiving at the server computer from the management server a de-activate command configured to de-activate the service profile on the server computer when the service profile was active, de-activating the service profile and changing the activation attribute at the server computer to an inactive status in response to the de-activate command.

8. A method comprising:
at a server computer in an enterprise computing system comprising a plurality of server computers that communicate with a management server, receiving from the management server data for a service profile that is installed concurrently on multiple server computers and that defines hardware, connectivity and operational attributes for the server computer and including an activation attribute for the service profile that indicates whether the service profile is in an active state or in a dormant state on the server computer;
installing the service profile on the server computer with the activation attribute; and
evaluating the activation attribute to determine whether to activate the service profile on the server computer such that the service profile is active on only one server computer in the enterprise computing system.

9. The method of claim 8, and further comprising receiving from the management server an activation command configured to activate the service profile on the server computer when the service profile was inactive, activating the service profile and changing the activation attribute at the server computer to an active status in response to the activate command.

10. The method of claim 8, and further comprising receiving at the server computer from the management server a de-activate command configured to de-activate the service profile on the server computer when the service profile was active, de-activating the service profile and changing the activation attribute at the server computer to an inactive status in response to the de-activate command.

11. An apparatus comprising:
a network interface device configured to enable communications over a network;
a memory;
a processor configured to:
store in the memory data indicating the service profiles installed on respective ones of a plurality of the server computers in an enterprise computing system and an activation status of the service profiles on the respective server computers, wherein each service profile comprises data defining hardware, connectivity and operational attributes for the server computer and including an activation attribute for the service profile indicating whether the service profile is in an active state or in a dormant state on the corresponding server computer; and
send to the respective server computers data for the service profiles with an activation attribute for each service profile such that any service profile that is installed concurrently on multiple server computers is in the active state on only one server computer at any given time.

12. The apparatus of claim 11, wherein the processor is configured to send a de-activate command to a first server computer on which a particular service profile is active, the de-activate command configured to de-activate the particular service profile on the first server computer, and to send an activate command to a second server computer on which the particular service profile is installed but not active, the activate command configured to activate the particular service profile on the second server computer.

13. The apparatus of claim 11, wherein the processor is further configured to send advertisement messages to notify other equipment in the computing system that utilize the plurality of server computers as to the service profiles and their activation attributes on the respective server computers.

14. A system comprising:
a plurality of server computers; and
a management server configured to communicate with the plurality of server computers, wherein the management server is configured to:
store data indicating the service profiles installed on respective server computers and an activation status of the service profiles on the respective server computers, wherein each service profile comprises data defining hardware, connectivity and operational attributes for the server computer and including an activation attribute for the service profile indicating whether the service profile is in an active state or in a dormant state on the corresponding server computer; and
send data for the service profiles to the respective server computers together with an activation attribute for each service profile such that any service profile that is installed concurrently on multiple server computers is in the active state on only one server computer at any given time;
wherein each server computer is configured to receive from the management server data for a server profile and an activation attribute for the service profile, and install the service profile with the activation attribute.

15. The system of claim 14, wherein each server computer is configured to receive from the management server an activate command configured to activate the service profile on the server computer when the service profile was inactive, activate the service profile and change the activation attribute to an active status in response to the activate command.

16. The system of claim 14, wherein each server computer is configured to receive from the management server a de-activate command configured to de-activate the service profile on the server computer when the service profile was active, de-activate the service profile and change the activation attribute to an active status in response to the activate command.

17. One or more non-transitory computer readable storage media encoded with software comprising computer executable instructions and when the software is executed, operable to:
at a management server in an enterprise computing system comprising a plurality of server computers that communicate with the management server, store data indicating the service profiles installed on respective server computers and an activation status of the service profiles on the respective server computers, wherein each service profile comprises data defining hardware, connectivity and operational attributes for the server computer and including an activation attribute for the service profile indicating whether the service profile is in an active state or in a dormant state on the corresponding server computer; and send to the respective server computers data for the service profiles with an activation attribute for each service profile such that any service profile that is installed concurrently on multiple server computers is in the active state on only one server computer at any given time.

18. The computer readable media of claim 17, and further comprising instructions that are operable to send a de-activate command to a first server computer on which a particular service profile is active, the de-activate command configured to de-activate the particular service profile on the first server computer; and send an activate command to a second server computer on which the particular service profile is installed but not active, the activate command configured to activate the particular service profile on the second server computer.

19. One or more computer readable storage media encoded with software comprising computer executable instructions and when the software is executed, operable to:

at a server computer in an enterprise computing system comprising a plurality of server computers that communicate with a management server, receive from the management server data for a service profile that is installed concurrently on multiple server computers and that defines hardware, connectivity and operational attributes for the server computer and including an activation attribute for the service profile that indicates whether the service profile is in an active state or in a dormant state on the server computer;

install the service profile on the server computer with the activation attribute; and evaluate the activation attribute to determine whether to activate the service profile on the server computer such that the service profile is active on only one server computer in the enterprise computing system.

20. The computer readable media of claim 19, and further comprising instructions that are operable to receive from the management server an activation command configured to activate the service profile on the server computer when the service profile was inactive, activate the service profile and change the activation attribute at the server computer to an active status in response to the activate command.

21. The computer readable media of claim 19, and further comprising instructions that are operable to receive from the management server a de-activate command configured to de-activate the service profile on the server computer when the service profile was active, de-activate the service profile and change the activation attribute at the server computer to an inactive status in response to the de-activate command.

* * * * *